(12) United States Patent
Nagato (10) Patent No.: US 12,192,416 B2
(45) Date of Patent: Jan. 7, 2025

(54) IMAGE PROCESSING SYSTEM (71) Applicant: Konica Minolta, Inc., Tokyo (JP)

(72) Inventor: Hiromu Nagato, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/503,605

(22) Filed: Nov. 7, 2023

(65) Prior Publication Data

US 2024/0163377 A1    May 16, 2024

(30) Foreign Application Priority Data

Nov. 15, 2022  (JP) .................................. 2022-182229

(51) Int. Cl.
| | | |
|---|---|---|
| *H04N 1/00* | (2006.01) | |
| *B41M 7/00* | (2006.01) | |
| *G03G 15/00* | (2006.01) | |
| *G06T 7/00* | (2017.01) | |
| *H04N 1/60* | (2006.01) | |

(52) U.S. Cl.
CPC ...... *H04N 1/00082* (2013.01); *B41M 7/0027* (2013.01); *G03G 15/6582* (2013.01); *G06T 7/001* (2013.01); *H04N 1/00037* (2013.01); *H04N 1/00633* (2013.01); *H04N 1/6097* (2013.01); *G06T 2207/10024* (2013.01); *G06T 2207/30144* (2013.01); *G06T 2207/30168* (2013.01)

(58) Field of Classification Search
CPC ........... H04N 1/00082; H04N 1/00037; H04N 1/00633; H04N 1/6097; B41M 7/0027; G03G 15/6582; G06T 7/001; G06T 2207/10024; G06T 2207/30144; G06T 2207/30168
USPC ...................................................... 358/3.24
See application file for complete search history.

(56) References Cited

U.S. PATENT DOCUMENTS

| | | | | |
|---|---|---|---|---|
| 4,909,891 | A * | 3/1990 | Sumi .................... | B32B 38/1858 156/497 |
| 11,868,069 | B2 * | 1/2024 | Yamauchi ............ | G03G 15/206 |
| 2004/0161257 | A1 * | 8/2004 | Ishihara ................. | G06K 15/00 399/81 |
| 2019/0095146 | A1 * | 3/2019 | Yoshino ............... | H04N 1/0044 |
| 2020/0298592 | A1 * | 9/2020 | Hatanaka ............. | B29C 64/393 |
| 2020/0301336 | A1 * | 9/2020 | Tsuchiya .............. | G03G 15/553 |
| 2020/0344374 | A1 * | 10/2020 | Takahashi .......... | H04N 1/00798 |
| 2021/0014380 | A1 * | 1/2021 | Imanishi ............... | G06F 3/1296 |
| 2023/0079216 | A1 * | 3/2023 | Suzuki ............... | G03G 15/2028 399/68 |
| 2024/0083158 | A1 * | 3/2024 | Kitaguchi ........... | B32B 38/0004 |

FOREIGN PATENT DOCUMENTS

JP           2008044129 A      2/2008

* cited by examiner

*Primary Examiner* — Negussie Worku
(74) *Attorney, Agent, or Firm* — CANTOR COLBURN LLP

(57) ABSTRACT

An image processing system includes: a laminator that laminates an image surface of paper on which an image is formed, and an image reader that is disposed downstream of the laminator in a paper transport direction and reads the image surface of the paper after the lamination by the laminator.

10 Claims, 9 Drawing Sheets

IMAGE PROCESSING SYSTEM

CROSS-REFERENCE TO RELATED APPLICATIONS

The present invention claims priority under 35 U.S.C. § 119 to Japanese Patent Application No. 2022-182229 filed on Nov. 15, 2022, the entire contents of which being incorporated herein by reference.

TECHNICAL FIELD

The present invention relates to an image processing system.

DESCRIPTION OF THE RELATED ART

Conventionally, there has been known a laminating apparatus that laminates a paper (printed matter) on which an image is formed by an image former disposed upstream, by coating the paper with a transparent resin film (see, for example, JP-A-2008-44129).

SUMMARY OF THE INVENTION

When lamination is performed using a laminating apparatus as described above, hue (appearance of color) of the laminated product changes after the lamination. This is a problem caused by transmitted light and reflected light, and the amount of the change in hue depends on the material and thickness of the film and the surface property of the film and the paper. Generally, lamination with films of polypropylene (PP) materials leads to globally redder or bluer hue. In addition, when glossy lamination leads to deeper color in appearance since specular reflection is large and diffuse reflection is small. On the other hand, mat lamination leads to whitish appearance since specular reflection is small and diffuse reflection is large.

There is also a problem that wrinkles occur in the film after lamination. In general, it is considered that the cause of the wrinkles is so-called misalignment in which the rollers that transport the paper are not arranged in parallel, and that the wrinkles occur due to loss of tension balance of the laminate film that is caused by tension difference in the film surface due to the misalignment.

An object of the present invention is to provide an image processing system capable of detecting a defect such as a change in hue or occurrence of wrinkles due to lamination.

To achieve at least one of the abovementioned objects, according to an aspect of the present invention, image processing system reflecting one aspect of the present invention includes:

- a laminator that laminates an image surface of paper on which an image is formed, and
- an image reader that is disposed downstream of the laminator in a paper transport direction and reads the image surface of the paper after the lamination by the laminator.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

Figure 1:
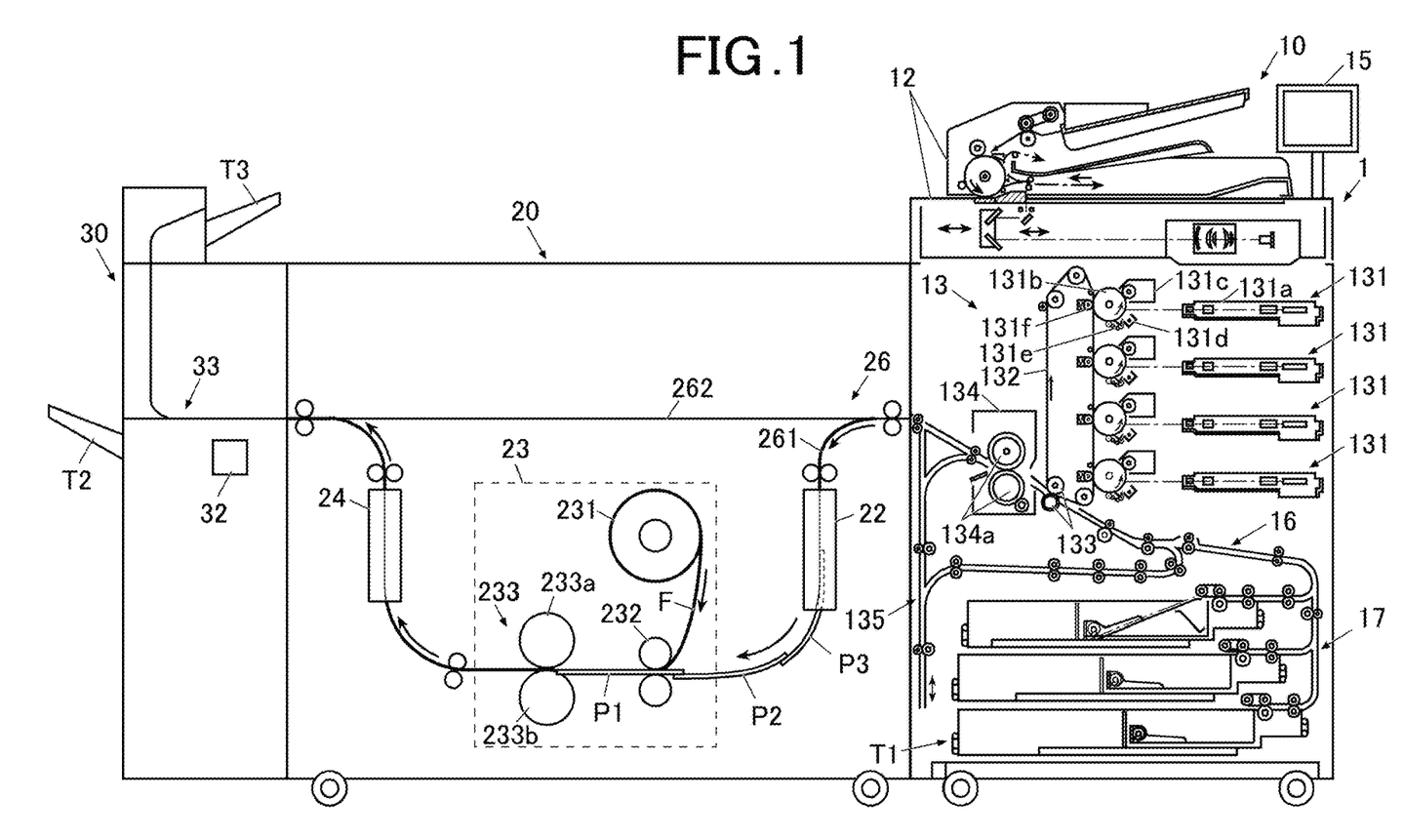
FIG. 1 is a diagram showing a schematic configuration of an image processing system according to the present embodiment.

As shown in FIG. 1, an image processing system 1 according to the present embodiment includes an image forming apparatus 10 that forms an image on a paper based on print data, a laminating apparatus 20 that is connected downstream of the image forming apparatus 10 and laminates an image surface of the paper on which the image is formed by the image forming apparatus 10 (the image former 13), and an image reading apparatus 30 that is disposed downstream of the laminating apparatus 20 (laminator 23) in a paper transport direction and reads the image surface of the paper after the lamination by the laminator.

Figure 2:
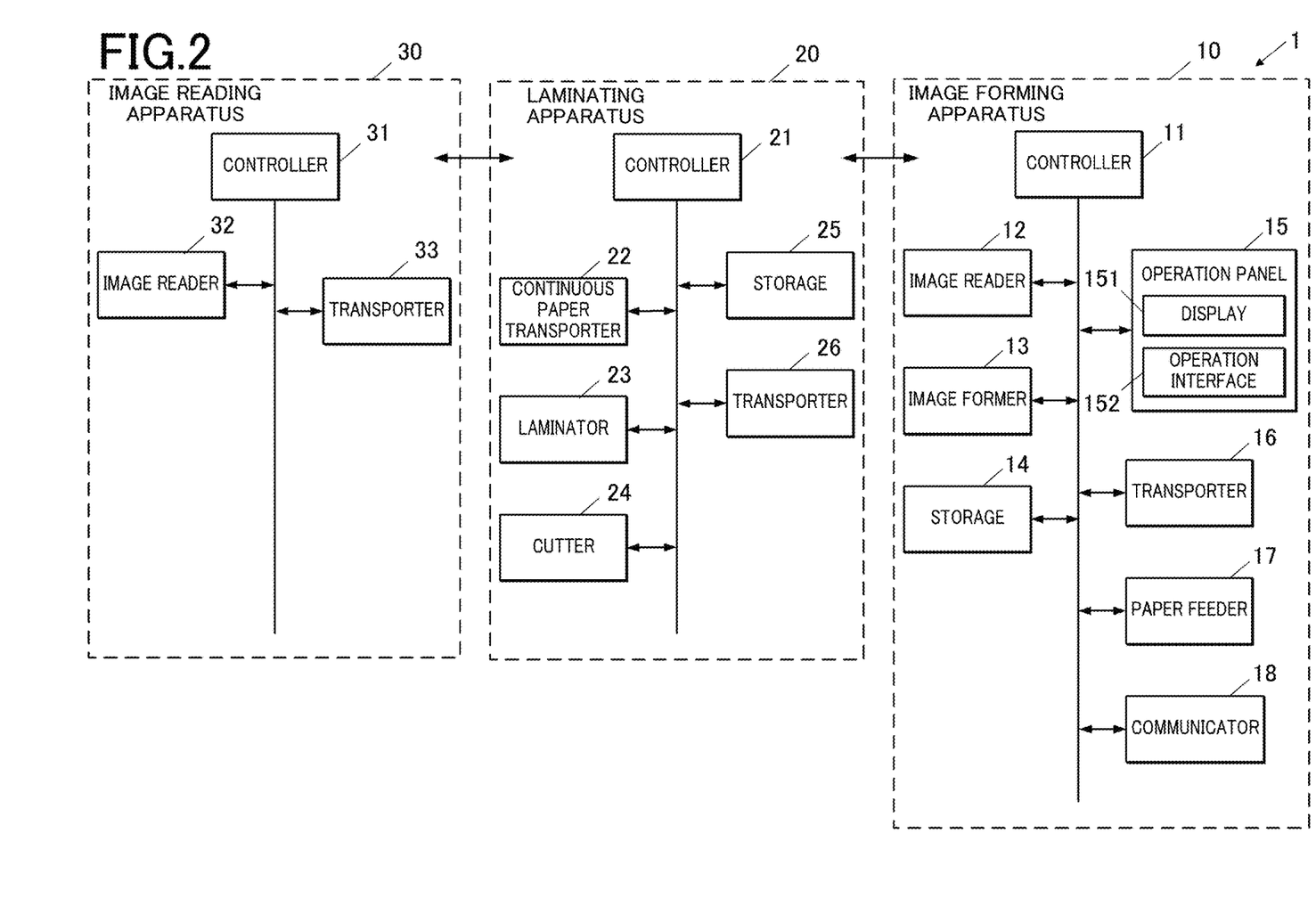
FIG. 2 is a diagram showing a functional configuration of image processing system according to the present embodiment.

As shown in FIG. 1 and FIG. 2, the image forming apparatus 10 includes a controller 11 (first hardware processor), an image reader 12, an image former 13, a storage 14, an operation panel 15 (a display 151 and an operation interface 152), a transporter 16, a the paper feeder 17, and a communicator 18.

The controller 11 includes a central processing unit (CPU), a random access memory (RAM), a read only memory (ROM) or the like. The CPU reads out various processing programs stored in the ROM in response to an operating signal inputted from the operation interface 152 and an instruction signal received by the communicator 18, develops them in the RAM, and controls operation of the image forming apparatus 10 in an overall manner in cooperation with various programs developed in the RAM.

The image reader 12 performs scanning exposure of an image of a document placed on a document table or an automated document transporter (ADF: Automatic Document Feeder) by an optical system of a scanning exposure device, and reads the reflected light by a line image sensor, thereby obtaining an image signal. The image signal is subjected to A/D conversion, shading correction, compression, or the like, and is then inputted to the controller 11 as image data.

The image former 13 forms an image on a paper via an electrophotographic method based on print data (the image data read by the image reader 12 or image data received from an external device). That is, the image former 13 forms a toner image on the paper. The image former 13 forms an image of four colors C, M, Y, and K on the paper according to pixel values of the four colors of each pixel in the image data.

As illustrated in FIG. 1, the image former 13 includes four writer 131, an intermediate transfer belt 132, a secondary transfer roller 133, a fixer 134, and the like.

The four writers 131 are arranged in series along a belt surface of the intermediate transfer belt 132 to form an image of C, M, Y, and K colors. Each of the writers 131 differs only in the colors of the image to be formed, and has the same configuration, and includes an optical scanner 131a, an image carrier 131b, a developing device 131c, a charger 131d, a cleaner 131e, and a primary transfer roller 131f.

At the time of image formation, each writer 131 charges the image carrier 131b with the charger 131d and then scans the image carrier 131b with light flux emitted by the optical scanner 131a based on the image data to form an electrostatic latent image. The developing device 131c supplies the electrostatic latent image with toner to develop the electrostatic latent image, and thus an image (monochromatic toner image) is formed on image carrier 131b.

Each image formed on the image carrier 131b of each of the four writers 131 is sequentially transferred (primary transfer) onto the intermediate transfer belt 132 by the respective primary transfer roller 131f. As a result, an image (color toner image) including the respective colors is formed on the intermediate transfer belt 132. The intermediate transfer belt 132 is an image carrier that rotates in such a manner that the intermediate transfer belt 132 is wound around a plurality of rollers. After the primary transfer, the toner remaining on the image carrier 131b is removed by the cleaner 131e.

In the image former 13, a paper is fed from paper feeder tray T1 according to a timing at which the images on the rotating the intermediate transfer belt 132 reach the position of the secondary transfer rollers 133. One of a pair of roles which constitute the secondary transfer rollers 133, is pressed against the intermediate transfer belt 132, and the other of the pair of roles is one of the plurality of rollers that winds the intermediate transfer belt 132. The image (color toner image) is transferred (secondary transfer) from the intermediate transfer belt 132 onto the paper due to pressure contact of the secondary transfer roller 133, and then the paper is transported to the fixer 134 and subjected to a fixing process. The fixing process is a process in which the paper is heated and pressed by a fixing rollers 134a to fix the image on the paper. When images are to be formed on both sides of the paper, the paper is transported to a reversing path 135 to be reversed, and then is fed again to the position of the secondary transfer rollers 133.

The storage 14 is a non-volatile storage unit configured by a hard disk drive (HDD), a solid state drive (SSD), and the like, and stores various programs, various setting data, and the like in a readable and writable manner from the controller 11.

The operation panel 15 includes a display 151 that displays various types of information to a user, and the operation interface 152 that accepts an operation input by the user.

The display 151 is constituted by a color liquid crystal display or the like and displays an operation screen or the like (various setting screens, various buttons, operation status of respective functions, and the like) in accordance with a display control signal inputted from the controller 11.

The operation interface 152 includes a touch panel provided on a screen of the display 151 and various hard keys arranged around the screen of the display 151. When buttons displayed on the screen is pressed by a finger, a touch pen, or the like, the operation interface 152 detects the coordinates of the pressed positions in terms of voltage values, and outputs operation signals associated with the detected positions to the controller 11. The touch panel is not limited to the pressure sensitive type, and may be, for example, an electrostatic type or an optical type. When the hard keys are pressed, the operation interface 152 outputs operating signals associated with the pressed keys to the controller 11.

The transporter 16 includes a plurality of pairs of rollers, and transports the paper supplied from the paper feeder 17 to the image former 13, and transports the paper on which an image is formed by the image former 13 to the laminating apparatus 20.

The paper feeder 17 includes a paper feeder trays T1 and supplies paper from the paper feeder trays T1 to the image former 13. Each paper feeder tray T1 stores a predetermined type of paper and a predetermined size of paper for each paper feeder tray T1.

The communicator 18 is an interface that connects the image forming apparatus 10 to a communication network. The communicator 18 includes a communication IC (Integrated Circuit), a communication connector, and the like, and transmits and receives various types of data to and from an external device connected to the communication network using a predetermined communication protocol under the control of the controller 11. The communicator 18 is also capable of inputting and outputting various types of data via USBs (Universal Serial Bus).

As illustrated in FIG. 1 and FIG. 2, the laminating apparatus 20 includes a controller 21, a continuous paper transporter 22, a laminator 23, a The cutter 24, a storage 25, a transporter 26, and the like.

The controller 21 includes a CPU, a RAM, a ROM or the like. The CPU reads out various process programs stored in the ROM, develops them in the RAM, and controls operations of the laminating apparatus 20 in an integrated manner in cooperation with the various programs developed in the RAM.

The continuous paper transporter 22 is provided upstream of the laminator 23 in a paper transport path.

The continuous paper transporter 22 overlaps front end portions and rear end portions of paper (sheets of paper) transported from the image former 13 of image forming apparatus 10. Specifically, the continuous paper transporter 22 transports paper in a continuous belt shape by superimposing a rear end portion of preceding paper on a front end portion of succeeding paper in a predetermined amount. For example, as shown in FIG. 1, the continuous paper transporter 22 transports paper P1, P2, P3 such that a rear end portion of the paper P1 slightly (that is, in a predetermined amount) overlaps a front end portion of the paper P2. In addition, the continuous paper transporter 22 transports the paper P1, P2, P3 such that a rear end portion of the paper P2 slightly overlaps a front end portion of the paper P3.

The laminator 23 performs lamination by superimposing a film (laminate film) F on a plurality of transported sheets of paper. The laminator 23 performs the lamination by superimposing the film F having an adhesive layer on the plurality of sheets of paper. The laminator 23 continuously attaches the film F to the surface (front surface) of the paper superimposed by the continuous paper transporter 22 on which the image is formed by image forming apparatus 10. That is, the laminator 23 laminate an image surface of paper on which an image is formed.

The laminator 23 includes a film roll 231, a paster 232, a laminate fixer 233, and the like.

In the film roll 231, a film F including a transparent resin film layer and an adhesive layer is formed in a roll shape. The film F is coated with a hot-melt adhesive on one side (the side in contact with the paper), and an adhesive layer is formed thereon.

The film F is transported from the film roll 231 to a nip portion of the paster 232.

The paster 232 includes a pair of rollers and holds the paper and the film F in a nip portion formed by the pair of rollers to adhere the adhesive layer of the film F to the front face of the paper. As a result, the paper and the film F are bonded to each other. Since the continuous paper transporter 22 has overlapped the front end portions and the rear end portions of the continuously transported sheets of paper, the adhesive applied to the films F is prevented from contacting other than the paper in paths after the paster 232.

The laminate fixer 233 integrates the film F and the paper by applying at least one of heat and pressure to the superimposed film F and the paper.

In the present embodiment, the laminate fixer 233 includes a heating roller 233a and a pressure roller 233b and fixes the film F to the paper by applying heat and pressure to the paper and the film F bonded by the paster 232.

The heating roller 233a incorporates a halogen-heater or the like and heats the film F and the paper in a stacked state.

The pressure roller 233b is biased upward by a biasing member (not shown) such as a spring and is pressed against the heating roller 233a to form the nip portion in which the heating roller 233a and the pressure roller 233b are in surface contact with each other.

The heating roller 233a and the pressure roller 233b melt the adhesive layer of the film F, adhere the melted adhesive layer to the front surface of the paper, and then perform thermocompression bonding.

The cutter 24 is provided downstream of the laminator 23 in the paper transport path, and cuts only the film F between the continuously transported sheets of paper on which the film F is superimposed.

The cutter 24 cuts the film F by inserting a cutter (not shown) between continuously transported sheets of paper (between the rear end portion the preceding paper and the front end portion of the succeeding paper) and moving the cutter in a width direction of the paper. The cutter 24 inserts a cutter between the paper and the paper (sheets of paper) superimposed by the continuous paper transporter 22, cuts the film F along an edge of the rear end portion of the preceding paper, and separates the preceding paper from the succeeding paper. That is, each paper which is connected each other by being adhered to the film F returns to a disconnected sheet of paper by cutting the film F between the paper and the paper.

The storage 25 is a non-volatile storage unit configured by a HDD, an SSD or the like, and stores various programs, various setting data, and the like in a readable and writable manner from the controller 21.

The transporter 26 includes a plurality of roller pairs, and transports the paper transported from the image forming apparatus 10, in the laminating apparatus 20. When the paper should be laminated, the transporter 26 transports the paper to the continuous paper transporter 22, the laminator 23, and the cutter 24 in this order via a first transport path 261 (see FIG. 1) and discharges the laminated paper to the image reading apparatus 30. When the paper should not be laminated, the transporter 26 transports the paper via a second transport path 262 (see FIG. 1) that does not pass through the continuous paper transporter 22, the laminator 23, and the cutter 24.

The image reading apparatus 30 reads an image surface of the paper before the lamination by the laminator 23 or after the lamination by the laminator 23.

As illustrated in FIG. 1 and FIG. 2, the image reading apparatus 30 includes a controller 31, an image reader 32, and a transporter 33. In addition, the image reading apparatus 30 is provided with a plurality of paper ejection trays (the paper ejection tray T2 and the paper ejection tray T3) that are disposed downstream of the image reader 32 in the paper transport direction and serve as a discharge destination of the paper.

The controller 31 includes a CPU, a RAM, a ROM or the like. The CPU reads out various process programs stored in the ROM, develops them in the RAM, and controls operations of the image reading apparatus 30 in an integrated manner in cooperation with various programs developed in the RAM.

The image reader 32 is disposed downstream of the laminator 23 in the paper transport direction, and reads an image surface of the paper before the lamination by the laminator 23 or after the lamination by the laminator 23.

Figure 3A:
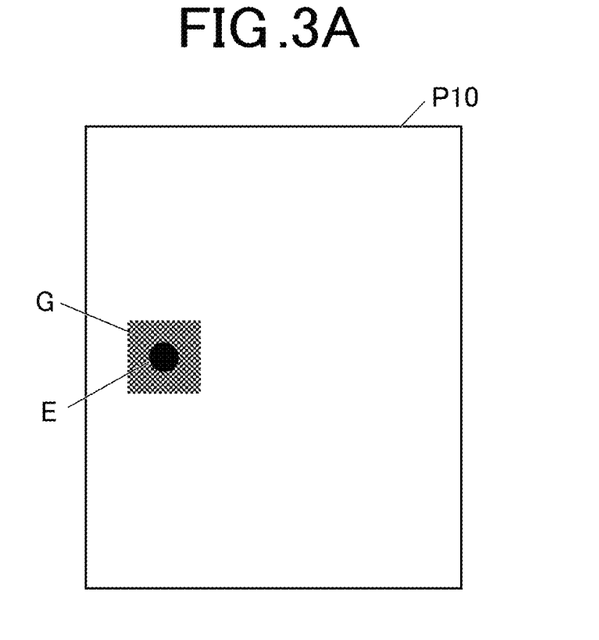
FIG. 3A is a diagram showing an example of a state in which an image at a predetermined position on a paper before lamination is read.
Figure 3B:
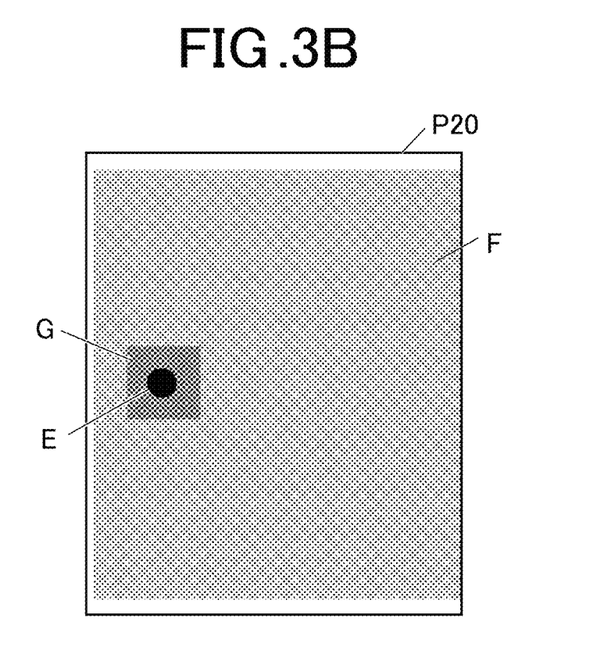
FIG. 3B is a diagram showing an example of a state in which an image at a predetermined position on a paper after lamination is read.

Specifically, as shown in FIG. 3A, the image reader 32 reads an image at a predetermined position E of paper P10 before the lamination by the laminator 23 and reads the image at the predetermined position E of the paper P20 after the lamination by the laminator 23, as shown in FIG. 3B. In FIG. 3A and FIG. 3B, the image reader 32 reads the image at the predetermined position E in a patch image G formed on the paper P10 (P20).

Figure 4A:
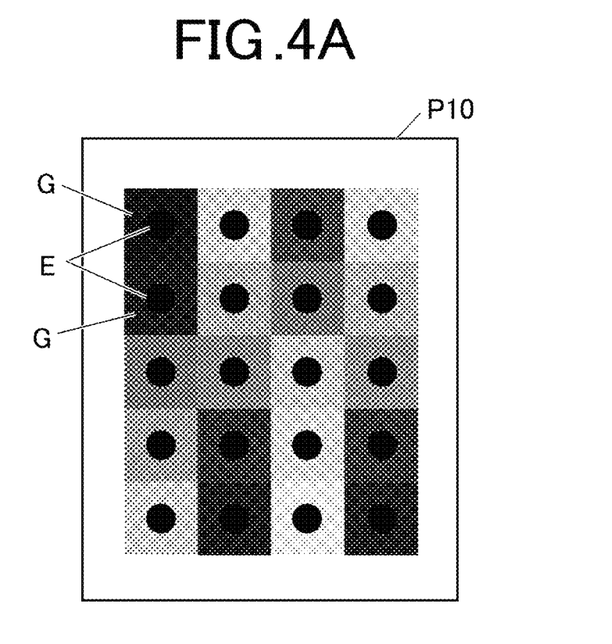
FIG. 4A is a diagram showing an example of a state in which images at predetermined positions on a paper before lamination is read.
Figure 4B:
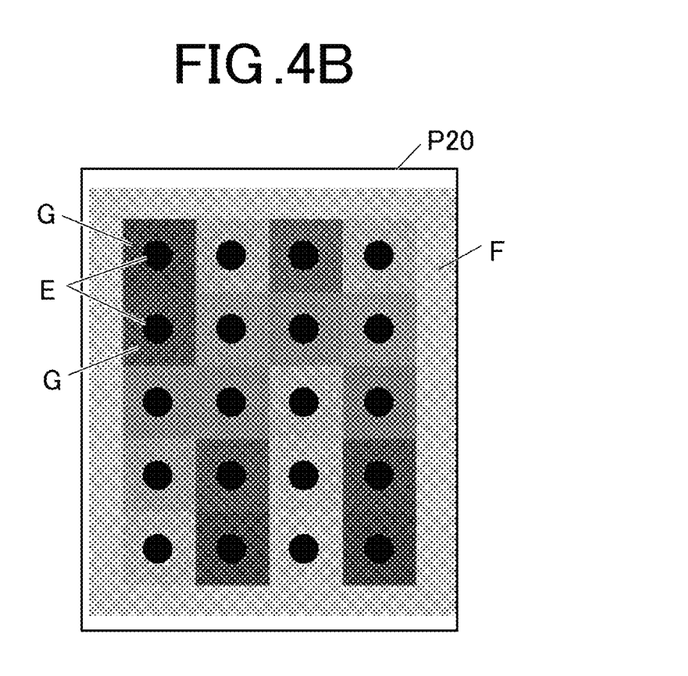
FIG. 4B is a diagram showing an example of a state in which images at predetermined positions on a paper after lamination is read.

Further, as shown in FIG. 4A, the predetermined position may be each of two or more arbitrary positions on paper. In an example shown in FIG. 4B, the image reader 32 reads images at respective predetermined positions E (20 predetermined positions E in all) in a plurality of patch images G (20 patch images G in FIG. 4A and FIG. 4B) formed on the paper P10 (P20).

Figure 5A:
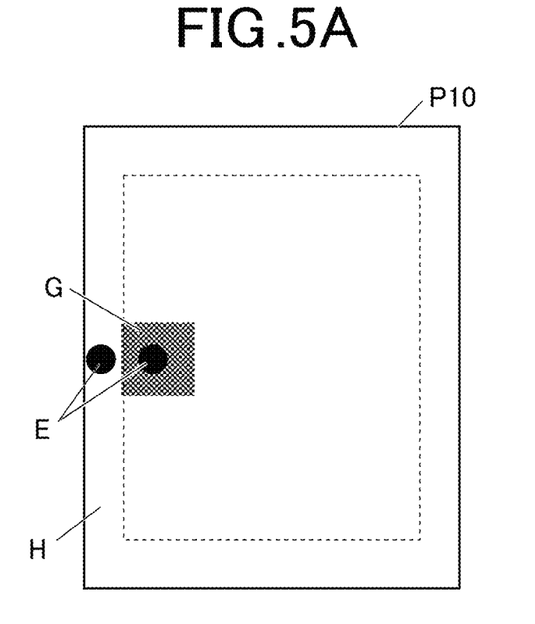
FIG. 5A is a diagram showing an example of a state in which an image at a predetermined position in an area where no image is formed, on a paper before lamination is read.
Figure 5B:
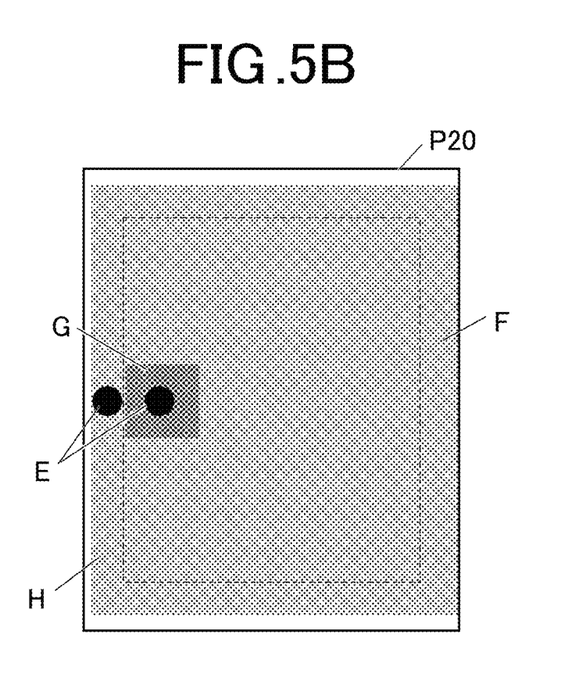
FIG. 5B is a diagram showing an example of a state in which an image at a predetermined position in an area where no image is formed, on a paper after lamination is read.

Further, as shown in FIG. 5A, the predetermined position may include no image formed thereat. In the embodiment shown in FIG. 5B, the image reader 32 reads an image at a predetermined position E in an area H where no image is formed, in addition to the image at a predetermined position E in the patch image G formed on the paper P10 (P20). Note that only an image at the predetermined position E in the area H where no image is formed may be read.

The transporter 33 includes a plurality of roller pairs, and transports the paper transported from the laminating apparatus 20 to the image reader 32, and discharges the paper read by the image reader 32 to the paper ejection tray T2 or the paper ejection tray T3. For example, paper (normal paper) on which no image defect is detected is discharged to the paper ejection tray T2, and paper (abnormal paper) on which an image defect is detected is discharged to the paper ejection tray T3.

Next, operations of the image processing system 1 according to the present embodiment will be described referring to a flow chart of FIG. 6. In the example shown in FIG. 6, the controllers 11, 21, and 31 of the apparatuses (the image forming apparatus 10, the laminating apparatus 20, and the image reading apparatus 30) constituting the image processing system 1 cooperatively execute the processes, but the present invention is not limited thereto. For example, any of the controllers 11, 21, and 31 (or a controller (not shown) provided separately from each apparatus) may play a central role (role as a command tower) and instruct the controller of each apparatus to execute processes.

First, the controller 11 of the image forming apparatus 10 starts proof printing (step S101).

Next, the controller 11 forms a color correction reading chart on paper (step S102). The paper on which the reading chart is formed is transported to the laminating apparatus 20.

Next, the controller 21 of the laminating apparatus 20 causes the paper, on which the reading chart is formed in the step S102, to be transported to the image reading apparatus 30 via the second transport path 262 (step S103). That is, the controller 21 causes the paper, on which the reading chart is formed, to be transported to the image reading apparatus 30 without performing a lamination.

Next, the controller 31 of the image reading apparatus 30 causes the image reader 32 to read the paper transported from the laminating apparatus 20 (the paper on which the reading chart is formed) (step S104). The paper read by the image reader 32 is ejected from the image reading apparatus 30 and then set again to the paper feeder 17 (paper feeder tray T1) of the image forming apparatus 10 by the user.

Next, the controller 11 of the image forming apparatus 10 causes the paper feeder 17 (paper feeder tray T1) to feed again the paper set again (step S105). The paper fed again is transported to the laminating apparatus 20 without newly forming images.

Next, the controller 21 of the laminating apparatus 20 causes the paper fed again in the step S105 to be transported to the laminator 23 via the first transport path 261 and causes the laminator 23 to perform lamination on the paper (step S106). The laminated paper is transported to the image reading apparatus 30.

Next, the controller 31 of the image reading apparatus 30 causes the image reader 32 to read the paper transported from the laminating apparatus 20 (the paper on which lamination is performed in the step S106) (step S107). The paper read by the image reader 32 is discharged to the paper ejection tray T2.

Next, the controller 31 compares the image read in the step S104 (the image before the lamination) with the image read in the step S107 (the image after the lamination), and obtains difference information (step S108).

Next, the controller 31 feeds back the difference data obtained in the step S108 to the controller 11 of the image forming apparatus 10 (step S109).

Next, the controller 11 of the image forming apparatus 10 performs automatic correction of colors based on the difference information fed back in the step S109 (step S110). That is, the controller 11 corrects the colors of the image formed by the image former 13, based on the image read by the image reader 32 before and after the lamination.

Next, the controller 11 starts main print (step S111).

Next, the controller 11 causes an image (image for print) based on print data to be formed on paper (step S112). The paper on which the image is formed is transported to the laminating apparatus 20.

Next, the controller 21 of the laminating apparatus 20 causes the paper, on which an image is formed in the step S112, to be transported to the laminator 23 via the first transport path 261 and causes the laminator 23 to perform lamination on the paper (step S113). The laminated paper is transported to the image reading apparatus 30.

Next, the controller 31 of the image reading apparatus 30 causes the image reader 32 to read the paper transported from the laminating apparatus 20 (the paper on which lamination is performed in the step S113) (step S114).

Next, the controller 31 compares the image (read image) read in the step S114 with a comparison image (for example, the image for print (print data)) or an image read in advance by the image reader 32 apart from the present flowchart (regardless of whether or not lamination is performed)) (step S115).

Next, the controller 31 determines whether or not a defect of the image (wrinkles or the like) is detected based on the comparison in the step S115 (step S116). That is, the controller 31 compares the laminated image read by the image reader 32 with the comparative image (the print data or the image read by the image reader 32 in advance) to detect a defect of the image. For example, the controller 31 detects an image defect when the laminated image is out of the "preset standard (standard related to colors and wrinkles of the image)" reflected in the print data or the image read by the image reader 32 in advance.

When the controller 31 determines that a defect of the image is detected (step S116: YES), the controller 31 determines that the paper is an abnormal paper, and proceeds to the subsequent step S117.

On the other hand, when the controller 31 determines that a defect of the image is not detected (step S116: NO), the controller 31 determines that the paper is a normal paper and proceeds to step S119. The paper in which that a defect is not detected is ejected directly to the paper ejection tray T2.

In the step S117, the controller 31 feeds back the detected defect of the image to the controller 21 of the laminating apparatus 20. Thereafter, the paper in which the defect of the image is detected is discharged to the paper ejection tray T2.

Next, the controller 21 of the laminating apparatus 20 corrects a laminating condition based on the defect of the image fed back in the step S117 so as to suppress the occurrence of the defect (step S118). As a method for correcting the laminating condition, for example, a conventionally known technique can be applied, such as a method (see JP-A-2007-326657) in which an adjustment mechanism for an alignment (direction) of the conveyance rollers constituting the transporter 26 is configured to be provided, and the direction of the conveyance rollers is adjusted in accordance with the state of a defect (wrinkle) in the detected image, so that tension difference in a surface of the paper is maintained constant.

Next, the controller 11 of the image forming apparatus 10 determines whether or not the main print is completed (step S119).

When the controller 11 determines that the main print is completed (step S119: YES), the process is terminated as it is.

On the other hand, when the controller 11 determines that the main print is not completed (step S119: NO), the process proceeds to step S112, and the process of step S112 and the subsequent steps are performed again.

Figure 6:
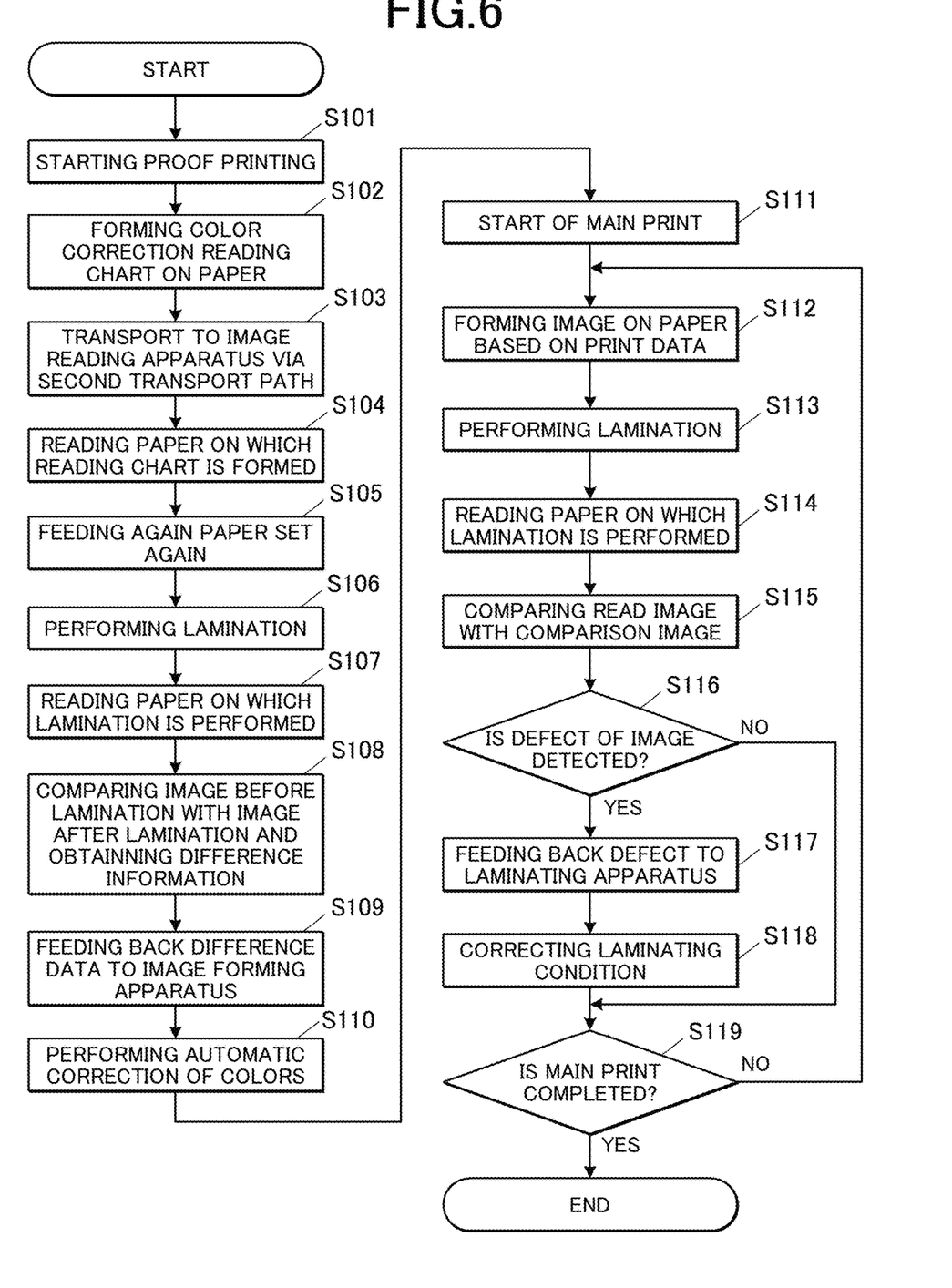
FIG. 6 is a flow chart showing an operation of an image processing system according to the present embodiment.

In the embodiment illustrated in FIG. 6, the lamination condition is corrected (steps S117, S118) when a defect of the image is detected (step S116: YES), but the present invention is not limited thereto. For example, instead of correcting the laminating condition, the paper (abnormal paper) in which the defect of the image is detected may be discharged to the paper ejection tray T3 other than the paper ejection tray T2 to which the paper (normal paper) in which the defect of the image is not detected is discharged. That is, the controller 31 may switch a discharge destination of the paper among the discharge destinations of the paper based on the image read by the image reader 32 (for example, whether a defect is present or not). The criterion for switching a discharge destination of the paper is not limited to whether a defect of the image is present or not, and can be arbitrarily set as appropriate according to the user's request.

As described above, the image processing system 1 according to the present embodiment includes a laminator 23 that laminates an image surface of paper on which an image is formed, and an image reader 32 that is disposed downstream of the laminator 23 in a paper transport direction and reads the image surface of the paper after the lamination by the laminator 23.

Therefore, according to the image processing system 1 of the present embodiment, since an image surface of the paper after the lamination can be read, it is possible to detect a defect such as a change in hue and occurrence of a wrinkle due to the lamination.

Further, according to the image processing system 1 of the present embodiment, the image reader 32 reads an image at a predetermined position on the paper before the lamination by the laminator 23, and reads the image at the predetermined position on the paper after the lamination by the laminator 23.

Therefore, according to the image processing system 1 of the present embodiment, since a difference can be calculated by reading an image at the same position on the paper before and after the lamination, it is possible to more accurately detect a defect such as a change in hue and occurrence of a wrinkle due to the lamination.

According to the image processing system 1 of the present embodiment, the predetermined position is each of two or more arbitrary positions on the paper.

Therefore, according to the image processing system 1 of the present embodiment, a plurality of patch images having different colors can be printed at once and the respective patch images can be read at once, so that the amount of paper used for printing the patch images can be reduced.

In addition, according to the image processing system 1 of the present embodiment, the predetermined position includes no image formed thereat.

Therefore, according to the image processing system 1 of the present embodiment, since a change in hue before and after the lamination can be detected also by detecting a change in hue before and after the lamination in a non-printed area, it is possible to add a reading portion without reducing the number of patch images.

Further, the image processing system 1 of the present embodiment includes an image former 13 that is disposed upstream of the laminator 23 in the paper transport direction and forms an image on the paper; and a controller 11 that corrects a color of the image formed by the image former 13 based on the image read by the image reader 32 before and after the lamination.

Therefore, according to the image processing system 1 of the present embodiment, since color information before and after the lamination can be acquired and fed back to the image former 13, it is possible to output a printed matter having a stable hue.

Further, the image processing system 1 of the present embodiment includes a controller 31 that compares the image read by the image reader 32 after the lamination with print data or an image read by the image reader 32 in advance to detect a defect of the image.

Therefore, according to the image processing system 1 of the present embodiment, since it is possible to compare a comparison image which has no defect occurs with the image after the lamination, it is possible to detect a defect of the image due to the lamination.

Further, according to the image processing system 1 of the present embodiment, the controller 21 corrects a laminating condition based on the detected defect of the image so that occurrence of the defect is suppressed.

Therefore, according to the image processing system 1 of the present embodiment, since the lamination condition can be corrected according to a state of the defect, the occurrence of the defect can be suppressed.

In addition, the image processing system 1 of the present embodiment includes a plurality of paper ejection trays (a paper ejection tray T2 and a paper ejection tray T3) that are disposed downstream of the image reader 32 in the paper transport direction and serve as discharge destinations of the paper, and a controller 31 that switches a discharge destination of the paper among the discharge destinations of the paper based on the image read by the image reader 32.

Therefore, according to the image processing system 1 of the present embodiment, since the discharge destination of the paper can be switched to another discharge destination that is different from that of normal paper when a predetermined state such as an image defect occurs, it is possible to prevent abnormal paper from being mixed in printed matters.

Although the present invention has been described in detail based on the embodiment of the present invention, the present invention is not limited to the above embodiment, and can be modified without departing from the gist thereof.

(Modification)

Figure 7:
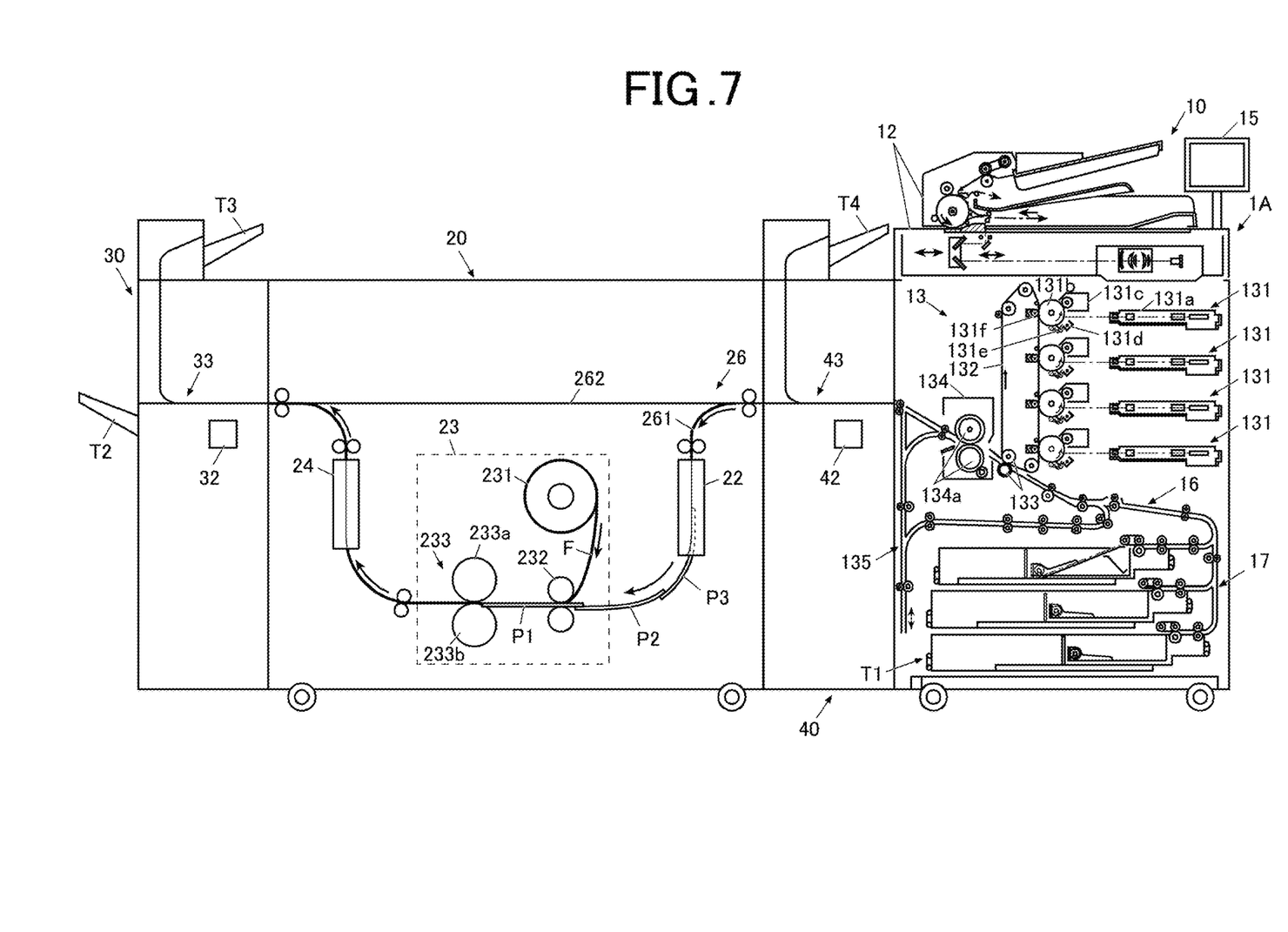
FIG. 7 is a diagram showing a schematic configuration of an image processing system according to a modification.
Figure 8:
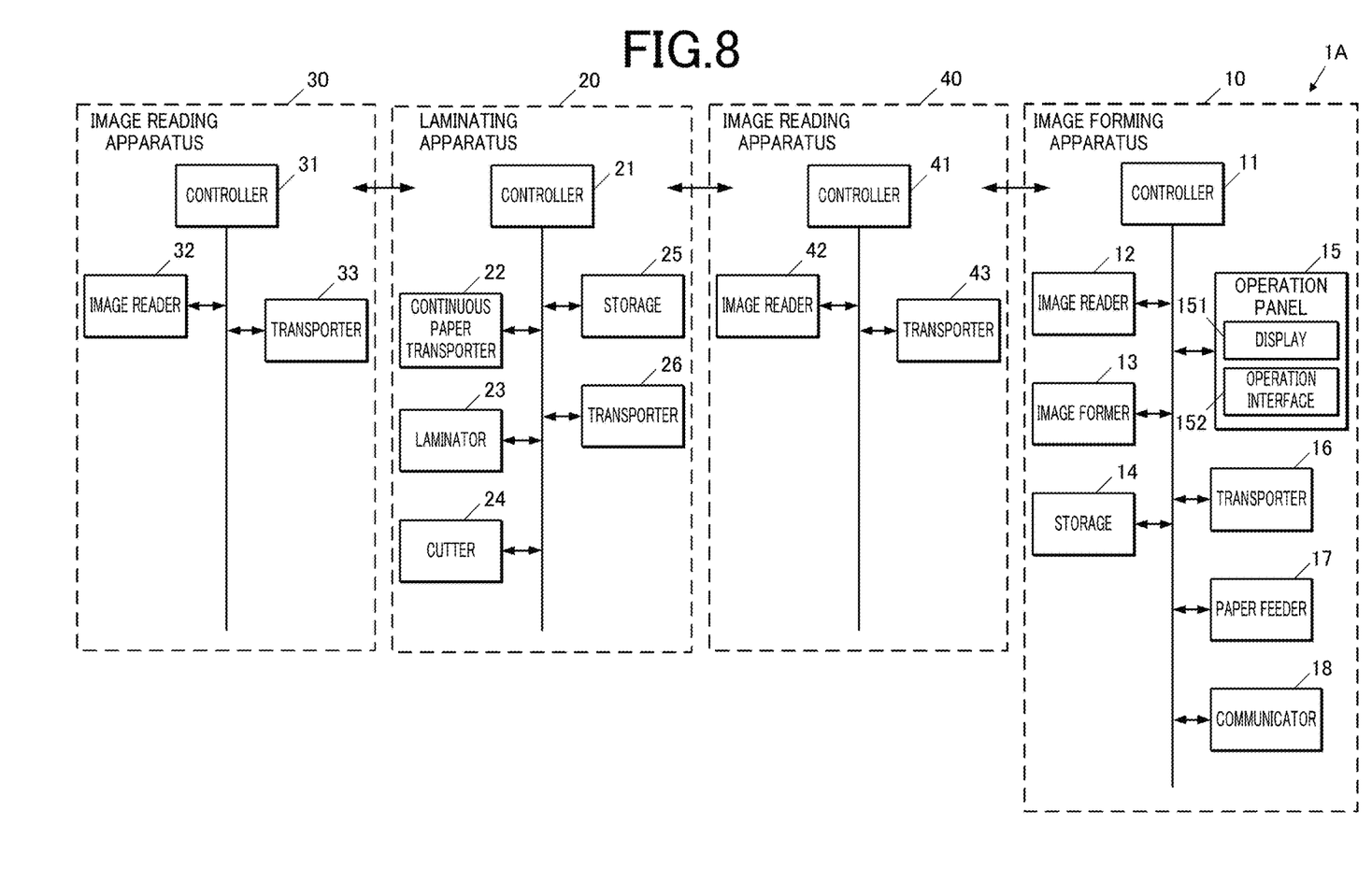
FIG. 8 is a diagram showing a functional configuration of an image processing system according to a modification.

For example, in the above embodiment, the configuration in which the image reading apparatus 30 is arranged downstream of the laminating apparatus 20 is described as an example, but the present invention is not limited thereto. For example, as shown in FIG. 7 and FIG. 8, in addition to downstream of the laminating apparatus 20, an image reading apparatus 40 may be disposed upstream (between the image forming apparatus 10 and the laminating apparatus 20) of the laminating apparatus 20.

The image reading apparatus 40 has a configuration similar to that of the image reading apparatus 30 except that only the paper ejection tray T4 is provided, and includes a controller 41, an image reader (another image reader, a second image reader) 42, and a transporter 43.

The image reader 42 is disposed upstream of the laminator 23 in the paper transport direction, and reads the image surface of the paper before the lamination by the laminator 23.

Figure 9:
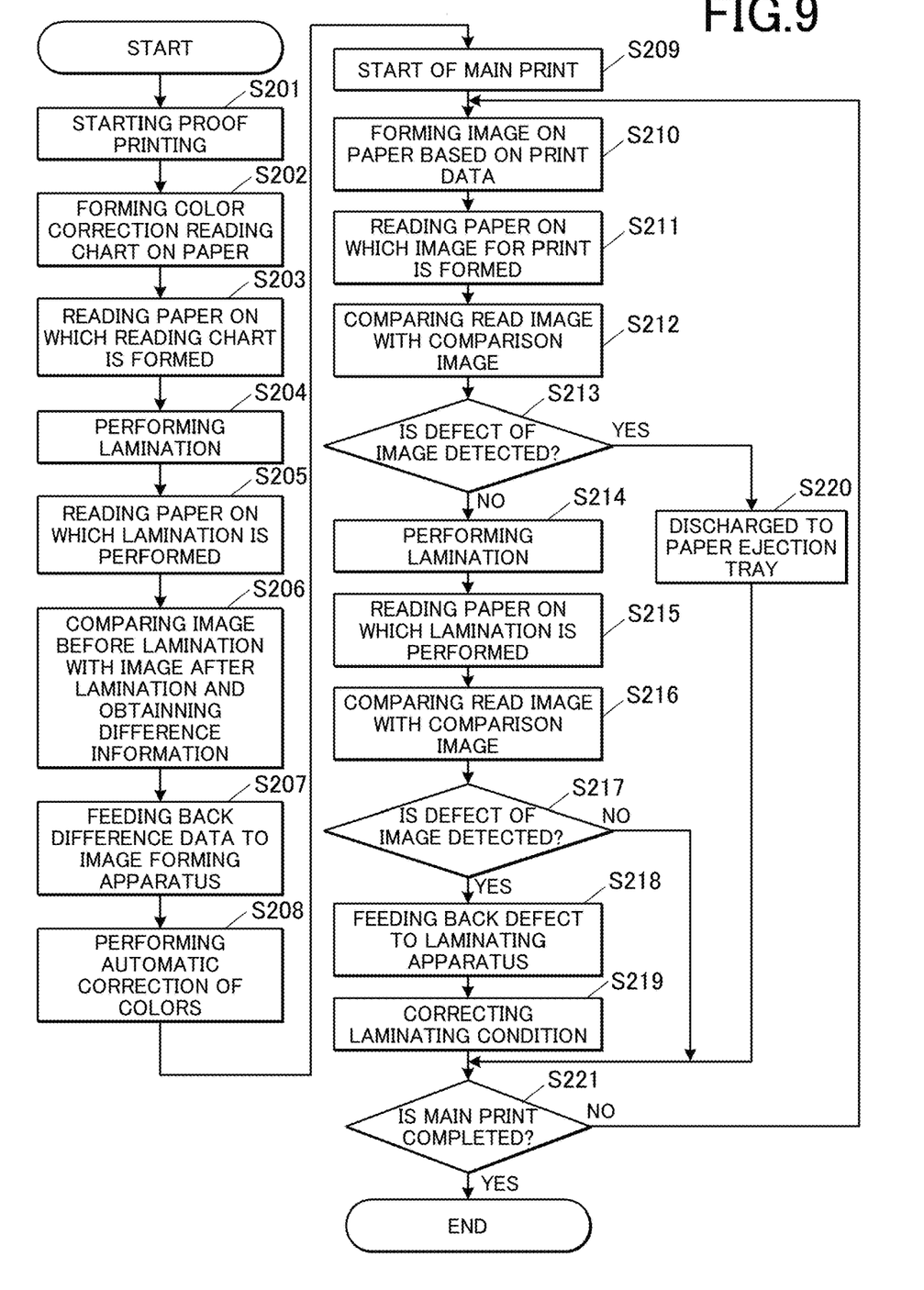
FIG. 9 is a flow chart showing an operation of an image processing system according to a modification.

Next, the operation of the image processing system 1A according to the modification will be described referring to a flow chart of FIG. 9.

First, the controller 11 of the image forming apparatus 10 starts proof printing (step S201).

Next, the controller 11 causes the paper to have a color correction reading chart formed thereon (step S202). The paper on which the reading charts are formed is transported to the image reading apparatus 40.

Next, the controller 41 of the image reading apparatus 40 causes the image reader 42 to read the paper (paper on which the reading chart is formed) transported from the image forming apparatus 10 (step S203). The paper read by the image reader 42 is transported to the laminating apparatus 20.

Next, the controller 21 of the laminating apparatus 20 causes the paper read by the image reader 42 in the step S203 to be transported to the laminator 23 via the first transport path 261, and causes the laminator 23 to perform lamination (step S204). The laminated paper is transported to the image reading apparatus 30.

Next, the controller 31 of the image reading apparatus 30 causes the image reader 32 to read the paper transported from the laminating apparatus 20 (the paper on which lamination is performed in the step S204) (step S205). The paper read by the image reader 32 is discharged to the paper ejection tray T2.

Next, the controller 31 compares the image read in the step S203 (the image before the lamination) with the image read in the step S205 (the image after the lamination), and obtains difference information (step S206).

Next, the controller 31 feeds back the difference data obtained in the step S206 to the controller 11 of the image forming apparatus 10 (step S207).

Next, the controller 11 of the image forming apparatus 10 performs automatic correction of colors based on the difference information fed back in the step S207 (step S208).

Next, the controller 11 starts main print (step S209).

Next, the controller 11 causes an image (image for print) based on print data to be formed on the paper (step S210). The paper on which the image is formed is transported to the image reading apparatus 40.

Next, the controller 41 of the image reading apparatus 40 causes the image reader 42 to read the paper transported from the image forming apparatus 10 (the paper on which the image for print is formed) (step S211).

Next, the controller 41 compares the image read in the step S211 (the read image) with a comparison image (the print data or an image before the lamination which is read in advance by the image reader 42 (or the image reader 32) apart from the present flowchart) (step S212).

Next, the controller 41 determines whether or not a defect of the image is detected based on the comparison in the step S212 (step S213).

When it is determined that the defect of the image is detected (step S213: YES), the controller 41 determines that the paper is an abnormal paper, and causes the paper, in which the defect of the image is detected, to be discharged to the paper ejection tray T4 (step S220). Then, the process proceeds to step S221. As a result, the lamination is not performed on the paper in which the defect of the image is detected, so that it is possible to prevent unnecessary use of expensive laminate.

On the other hand, when the controller 41 determines that a defect of the image is not detected (step S213: NO), the controller 41 determines that the paper is a normal paper, and proceeds to the subsequent step S214. The paper in which a defect of the image is not detected is transported to the laminating apparatus 20.

In the step S214, the controller 21 of the laminating apparatus 20 transports the paper on which a defect of the image is not detected in the step S213 to the laminator 23 via the first transport path 261 and causes the laminator 23 to perform lamination on the paper. The laminated paper is transported to the image reading apparatus 30.

Next, the controller 31 of the image reading apparatus 30 causes the image reader 32 to read the paper transported from the laminating apparatus 20 (the paper on which lamination is performed in the step S214) (step S215).

Next, the controller 31 compares the image read in the step S215 (read image) with the comparative image (the print data, the image read in the step S211 before the lamination or the image read in advance by the image reader 32 (or the image reader 42) apart from the present flow chart (regardless of whether or not lamination is performed)) (step S216).

Next, the controller 31 determines whether or not a defect of the image is detected based on the comparison in the step S216 (step S217).

When the controller 31 determines that a defect of the image is detected (step S217: YES), the controller 31 determines that the paper is an abnormal paper, and proceeds to the subsequent step S218.

On the other hand, when the controller 31 determines that the defect of the image is detected (step S217: NO), the controller 31 determines that the paper is a normal paper and proceeds to step S221. The paper in which that a defect is not detected is ejected directly to the paper ejection tray T2.

In the step S218, the controller 31 feeds back the detected defect of the image to the controller 21 of the laminating apparatus 20. Thereafter, the paper in which the defect of the image is detected is discharged to the paper ejection tray T2.

Next, the controller 21 of the laminating apparatus 20 corrects a laminating condition based on the defect of the images fed back in the step S218 so as to suppress the occurrence of the defect (step S219).

Instead of correcting the laminating condition, the paper (abnormal paper) in which the defect of the image is detected may be discharged to the paper ejection tray T3 other than the paper ejection tray T2 to which the paper (normal paper) in which the defect of the image is not detected is discharged.

In the step S221, the controller 11 of the image forming apparatus 10 determines whether or not the main print is completed.

When the controller 11 determines that the main print is completed (step S221: YES), the process is terminated as it is.

On the other hand, when the controller 11 determines that the main print is not completed (step S221: NO), the process proceeds to step S210, and the process of step S210 and subsequent steps is performed again.

As described above, since a second image reader (image reader 42) that is disposed upstream of the laminator 23 in the paper transport direction and reads the image surface of the paper after the lamination by the laminator 23 is provided, which makes it possible to read the image surface of the paper before and after the lamination by a single paper feed, it is possible to reduce the burden of the processing related to image reading. In addition, since whether or not a change in hue or a defect is caused due to lamination can be distinguished, it is possible to more accurately detect a defect such as a change in hue and occurrence of a wrinkle due to the lamination.

(Other Modifications)

In the above embodiment, a plurality of paper ejection trays (the paper ejection tray T2 and the paper ejection tray T3) are provided in the image reading apparatus 30, but the present invention is not limited thereto. For example, instead of providing a plurality of paper ejection trays, only one paper ejection tray (e.g., the paper ejection tray T2) may be provided, and every paper may be discharged to the paper ejection tray. In this case, the user may sort the normal paper and the other paper (abnormal paper, test paper, and the like).

Further, in the above embodiment, the image processing system 1 in which the image forming apparatus 10 including the image former 13, the laminating apparatus 20 including the laminator 23, and the image reading apparatus 30 including the image reader 32 are separately configured is exemplified as a configuration for implementing the present invention, but the present invention is not limited thereto. For example, the image former 13, the laminator 23, and the image reader 32 may be configured as an integrated apparatus (image processing apparatus). Further, for example, the image reader 32 may be built in the laminating apparatus 20 (that is, the image reading apparatus 30 is not provided as a separate apparatus).

In addition, the detailed configuration of each apparatus constituting image processing system and the detailed operation of each apparatus can be appropriately changed without departing from the gist of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An image processing system comprising:
   an image former that is disposed upstream of a laminator in the paper transport direction and forms an image on paper,
   the laminator that laminates by superimposing a film on an image surface of the paper on which the image has been formed,
   an image reader that is disposed downstream of the laminator in the paper transport direction and reads the image surface of the paper after the lamination by the laminator,
   a first hardware processor that corrects a color of the image formed by the image former based on the image read by the image reader before and after the lamination.

2. The image processing system according to claim 1, wherein the image reader reads an image at a predetermined position on the paper before the lamination by the laminator, and reads the image at the predetermined position on the paper after the lamination by the laminator.

3. The image processing system according to claim 2, wherein the predetermined position is each of two or more arbitrary positions on the paper.

4. The image processing system according to claim 2, wherein the predetermined position includes no image formed thereat.

5. The image processing system according to claim 1, further comprising another image reader that is disposed upstream of the laminator in the paper transport direction and reads the image surface of the paper before the lamination by the laminator.

6. An image processing system according to claim 2, further comprising:
   an image former that is disposed upstream of a laminator in the paper transport direction and forms an image on paper; and
   a laminator that laminates by superimposing a film on an image surface of paper on which the image has been formed,
   an image reader that is disposed downstream of the laminator in the paper transport direction and reads the image surface of the paper after the lamination by the laminator,
   a second hardware processor that determines whether or not a defect based on the image read by the image reader.

7. The image processing system of claim 5, wherein the second hardware processor that compares the image read by the image reader after the lamination with print data or an image read by the image reader in advance to detect a defect of the image.

8. The image processing system of claim 7, further comprising a third hardware processor, wherein
   the third hardware processor corrects a laminating condition based on the detected defect of the image so that occurrence of the defect is suppressed.

9. The image processing system according to claim 6, further comprising:
   a plurality of paper ejection trays that are disposed downstream of the image reader in the paper transport direction and serve as discharge destinations of the paper, and
   a fourth hardware processor that switches a discharge destination of the paper among the discharge destinations of the paper based on the image read by the image reader.

10. The image processing system according to claim 6, further comprising another image reader that is disposed upstream of the laminator in the paper transport direction and reads the image surface of the paper before the lamination by the laminator.

* * * * *